US012463355B1

(12) United States Patent
Chiang

(10) Patent No.: US 12,463,355 B1
(45) Date of Patent: Nov. 4, 2025

(54) DUAL CIRCULARLY POLARIZED ANTENNA STRUCTURE

(71) Applicant: AUDEN TECHNO CORP., Taoyuan (TW)

(72) Inventor: Chi-Ming Chiang, Taoyuan (TW)

(73) Assignee: AUDEN TECHNO CORP., Taoyuan (TW)

( * ) Notice: Subject to any disclaimer, the term of this patent is extended or adjusted under 35 U.S.C. 154(b) by 43 days.

(21) Appl. No.: 18/747,471

(22) Filed: Jun. 19, 2024

(51) Int. Cl.
*H01Q 21/24* (2006.01)
*H01Q 1/36* (2006.01)

(52) U.S. Cl.
CPC ............. *H01Q 21/245* (2013.01); *H01Q 1/36* (2013.01)

(58) Field of Classification Search
CPC ............ H01Q 1/36; H01Q 9/04; H01Q 9/045; H01Q 9/0428; H01Q 21/0006; H01Q 21/06; H01Q 21/061; H01Q 21/22; H01Q 21/24; H01Q 21/245; H01Q 13/206
See application file for complete search history.

(56) References Cited

U.S. PATENT DOCUMENTS

2022/0376398 A1* 11/2022 Chiang ................ H01Q 9/0435
2023/0076013 A1* 3/2023 Moallem ................ H01Q 21/24
2023/0369781 A1* 11/2023 Huang ................. H01Q 9/0492
2024/0305014 A1* 9/2024 Huang ................. H01Q 9/0414
2024/0356238 A1* 10/2024 Chiang .............. H01Q 21/0006
2025/0202118 A1* 6/2025 Chiang .................. H01Q 21/24

* cited by examiner

*Primary Examiner* — Thai Pham
(74) *Attorney, Agent, or Firm* — Li & Cai Intellectual Property Office

(57) ABSTRACT

A dual circularly polarized antenna structure includes a substrate, an M number of antenna arrays, and a feed module. Each of the antenna arrays includes two first antennas and two second antennas. Each of the first antennas and the second antennas includes two sub-antennas and two microstrip lines electrically coupled to the two sub-antennas. The two sub-antennas of the first antenna overlap through translation. The two sub-antennas of the second antenna overlap through translation. A center point is defined between the first antennas and the second antennas. One of the sub-antennas of each of the first antennas and one of the sub-antennas of each of the second antennas are adjacent to the center point, and have a 4-fold rotational symmetry relative to the center point. The feed module is electrically coupled to each of the antenna arrays for generating a first circular polarization and a second circular polarization.

8 Claims, 11 Drawing Sheets

DUAL CIRCULARLY POLARIZED ANTENNA STRUCTURE

FIELD OF THE DISCLOSURE

The present disclosure relates to an antenna structure, and more particularly to a dual circularly polarized antenna structure.

BACKGROUND OF THE DISCLOSURE

Conventional antenna structures are capable of achieving circular polarization, but still have much room for improvement. For example, the conventional antenna structures produce circular polarization by collaboration between antennas and two dual-feed phase shifters. However, due to high costs of the phase shifters, the conventional antenna structures can be costly. Furthermore, while the conventional antenna structure can achieve circular polarization by introducing a 90-degree phase difference through cooperation of the antennas and a power divider, a signal loss of the conventional antenna structure will be large.

SUMMARY OF THE DISCLOSURE

In response to the above-referenced technical inadequacy, the present disclosure provides a dual circularly polarized antenna structure.

In order to solve the above-mentioned problems, one of the technical aspects adopted by the present disclosure is to provide a dual circularly polarized antenna structure. The dual circularly polarized antenna structure includes a substrate, an M number of antenna arrays (M is a positive integer greater than or equal to 1), and a feed module. The substrate has a first extension direction and a second extension direction that is perpendicular to the first extension direction. The M antenna arrays are disposed on the substrate, and each of the M antenna arrays includes two first antennas and two second antennas. Each of the two first antennas includes two first sub-antennas and two first microstrip lines. The two first sub-antennas are arranged along the first extension direction. Each of the two first sub-antennas includes a first body, and a first receiving contact point and a first transmission contact point that are disposed on the first body, and one of the two first sub-antennas is configured to overlap another one of the two first sub-antennas when moving along the first extension direction. One of the two first microstrip lines is electrically coupled to the first receiving contact points of the two first sub-antennas and has a first receiving feed point, and another one of the two first microstrip lines is electrically coupled to the first transmission contact points of the two first sub-antennas and has a first transmission feed point. Each of the two second antennas includes two second sub-antennas and two second microstrip lines. The two second sub-antennas are arranged along the second extension direction. Each of the two second sub-antennas includes a second body, and a second receiving contact point and a second transmission contact point that are disposed on the second body, and one of the two second sub-antennas is configured to overlap another one of the two second sub-antennas when moving along the second extension direction. One of the two second microstrip lines is electrically coupled to the second receiving contact points of the two second sub-antennas and has a second receiving feed point, and another one of the two second microstrip lines is electrically coupled to the second transmission contact points of the two second sub-antennas and has a second transmission feed point. A center point is defined between the two first antennas and the two second antennas. One of the first sub-antennas of each of the two first antennas, and one of the second sub-antennas of each of the two second antennas are adjacent to the center point, and have a 4-fold rotational symmetry relative to the center point. The feed module is electrically coupled to each of the M antenna arrays for generating a first circular polarization and a second circular polarization. A direction of rotation of the first circular polarization is opposite to a direction of rotation of the second circular polarization.

In one of the possible or preferred embodiments, a 180-degree phase difference is provided between the first receiving feed points of the two first antennas, a 180-degree phase difference is provided between the second receiving feed points of the two second antennas, and a 90-degree phase difference is provided between each of the first receiving feed points and any one of the second receiving feed points. A 180-degree phase difference is provided between the first transmission feed points of the two first antennas, a 180-degree phase difference is provided between the second transmission feed points of the two second antennas, and a 90-degree phase difference is provided between each of the first transmission feed points and any one of the second transmission feed points.

In one of the possible or preferred embodiments, the two first receiving feed points of the two first microstrip lines and the two second receiving feed points of the two second microstrip lines are configured to jointly generate the first circular polarization through the feed module, and the two first transmission feed points of the two first microstrip lines and the two second transmission feed points of the two second microstrip lines are configured to jointly generate the second circular polarization through the feed module.

In one of the possible or preferred embodiments, the feed module includes an N number of receiving chips and an N number of transmitting chips, M is twice N, and N is a positive integer greater than or equal to 1. Each of the N receiving chips is disposed between any two adjacent ones of the M antenna arrays, so as to be electrically coupled to each of the first receiving feed points and each of the second receiving feed points of the two antenna arrays. Each of the N transmitting chips is disposed between any two adjacent ones of the M antenna arrays, so as to be electrically coupled to each of the first transmission feed points and each of the second transmission feed points of the two antenna arrays.

In one of the possible or preferred embodiments, the feed module includes M number of beamforming chips that are respectively disposed on center points of the M antenna arrays. The M beamforming chips are respectively electrically coupled to the two first receiving feed points, the two second receiving feed points, the two first transmission feed points, and the two second transmission feed points of the M antenna arrays.

In one of the possible or preferred embodiments, the dual circularly polarized antenna structure is applicable for a transmission frequency band. Each of the first bodies of the two first antennas and the second bodies of the two second antennas has a hexagonal shape and six side edges. A first shortest distance is defined between any two opposite ones of the six side edges that are parallel to each other, and the first shortest distance is 0.45 to 0.55 times a wavelength corresponding to a center frequency of the transmission frequency band.

In one of the possible or preferred embodiments, a position defined by orthogonally projecting the first transmission feed point onto the first body is adjacent to one of the six side edges, and a second shortest distance is defined there-between. A position defined by orthogonally projecting the first receiving feed point onto the first body is adjacent to one of the six side edges, and a third shortest distance is defined there-between. The second shortest distance is greater than the third shortest distance.

In one of the possible or preferred embodiments, a position defined by orthogonally projecting the second transmission feed point onto the second body is adjacent to one of the six side edges, and a second shortest distance is defined there-between. A position defined by orthogonally projecting the second receiving feed point onto the second body is adjacent to one of the six side edges, and a third shortest distance is defined there-between. The second shortest distance is greater than the third shortest distance.

Therefore, in the dual circularly polarized antenna structure provided by the present disclosure, by virtue of "one of the two first sub-antennas being configured to overlap another one of the two first sub-antennas when moving along the first extension direction, and one of the two second sub-antennas being configured to overlap another one of the two second sub-antennas when moving along the second extension direction," and "one of the first sub-antennas of each of the two first antennas and one of the second sub-antennas of each of the two second antennas being adjacent to the center point, and having a 4-fold rotational symmetry relative to the center point," the dual circularly polarized antenna structure can have low manufacturing costs and a reduced signal loss.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
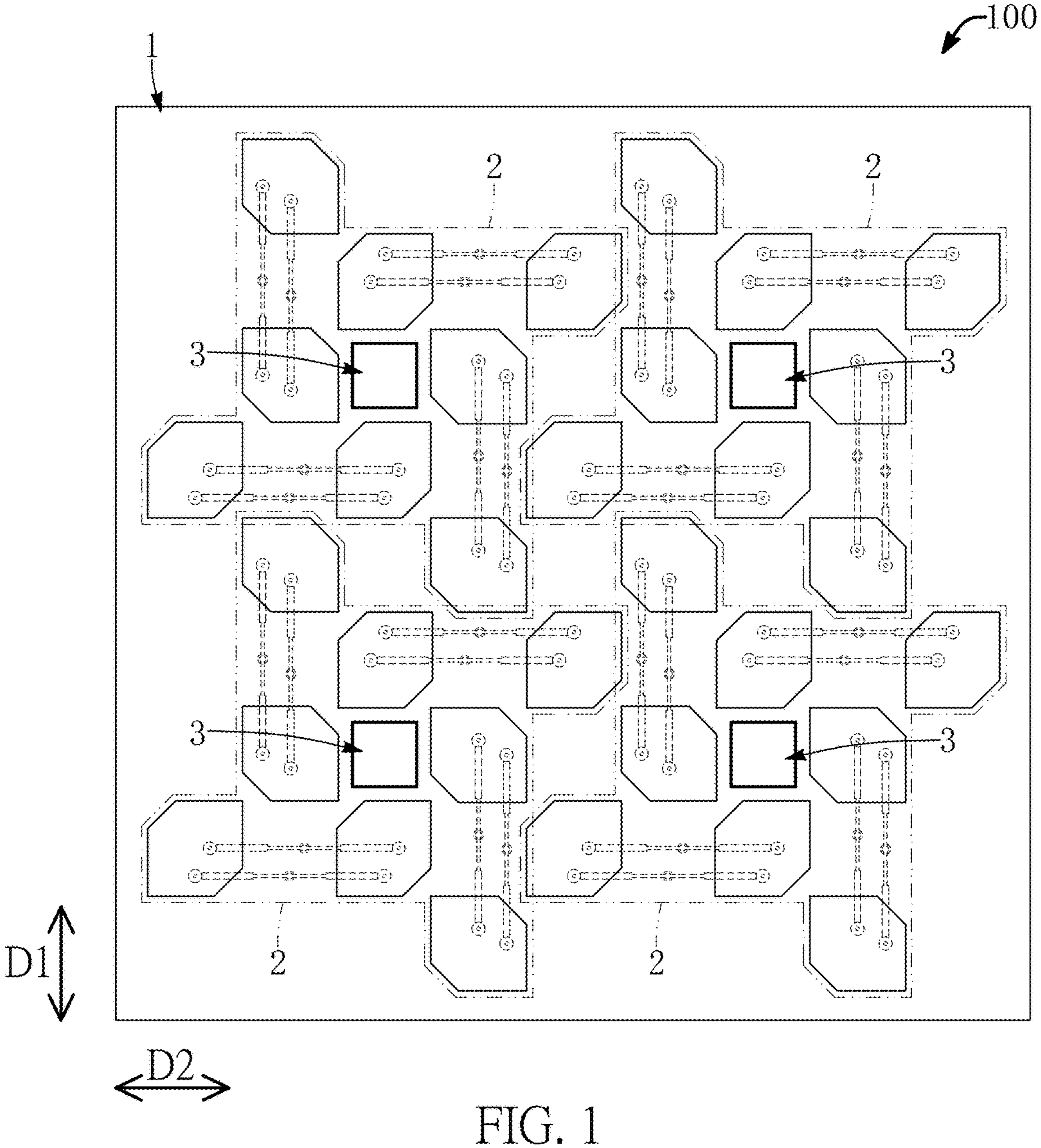
FIG. 1 is a schematic planar view of a dual circularly polarized antenna structure according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 4:
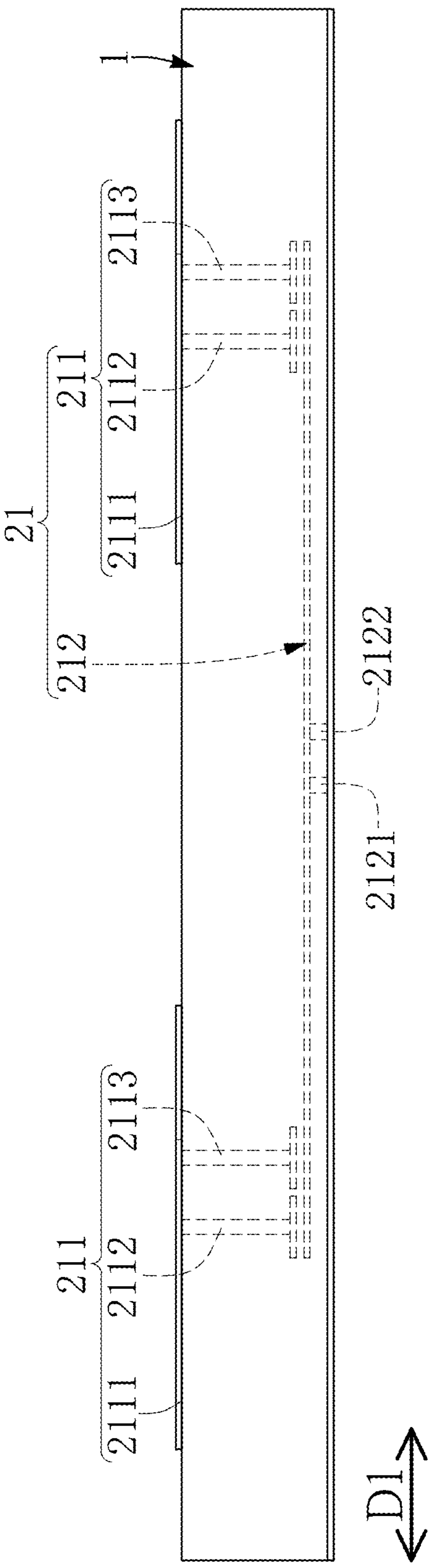
FIG. 4 is a schematic cross-sectional view of the first antenna according to the present disclosure.
Figure 5:
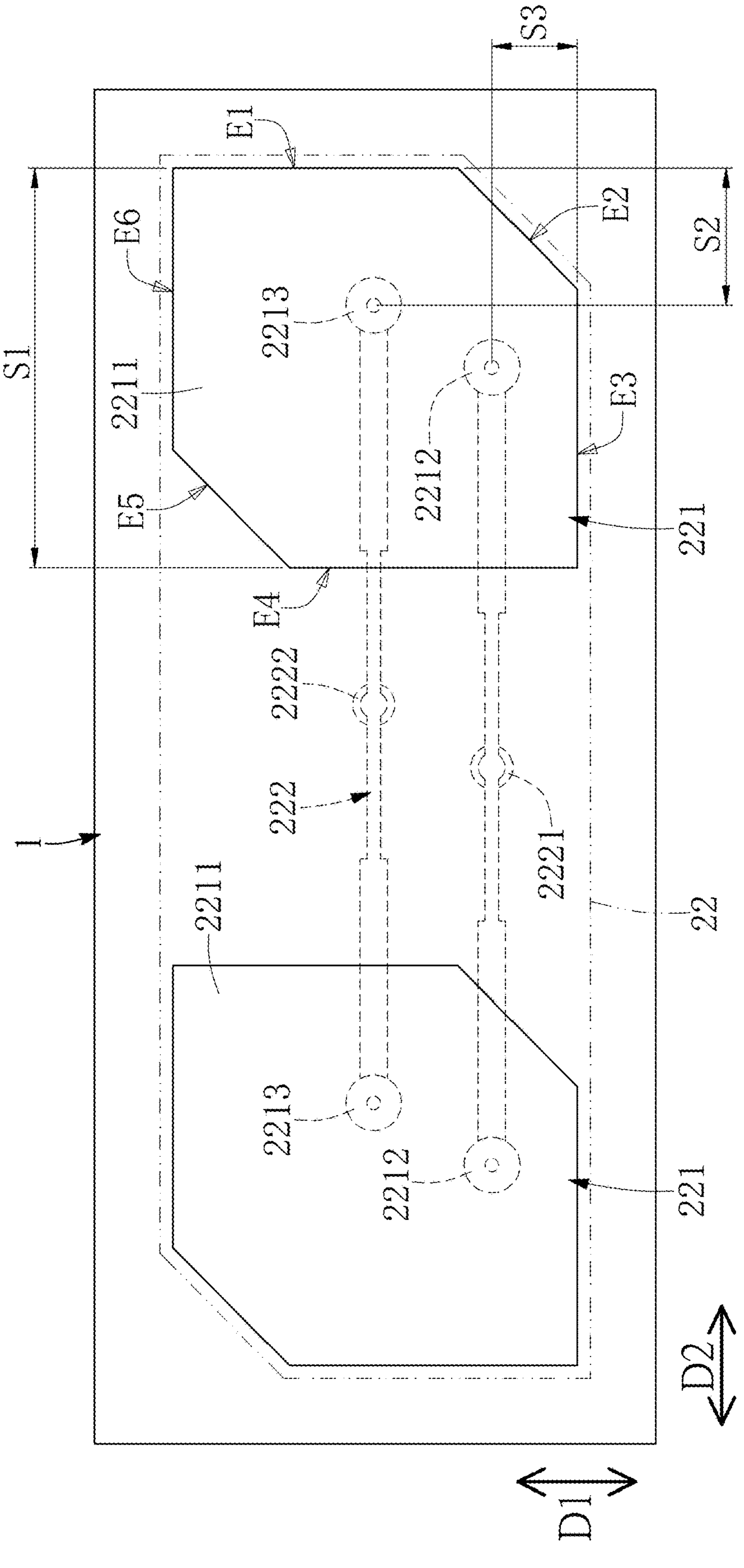
FIG. 5 is a schematic planar view of a second antenna according to the present disclosure.
Figure 6:
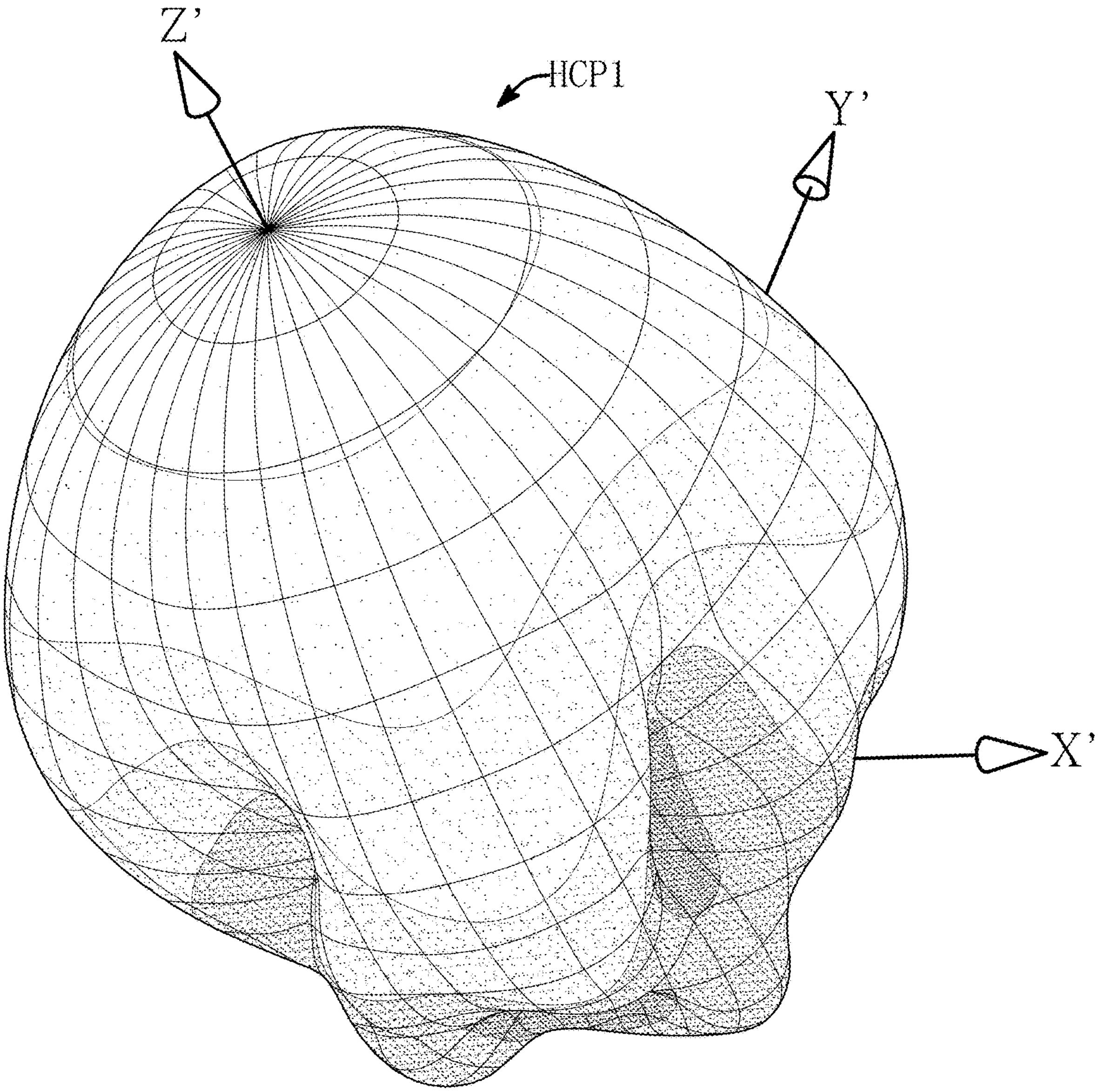
FIG. 6 is a schematic perspective view of a first circular polarization according to the present disclosure.
Figure 7:
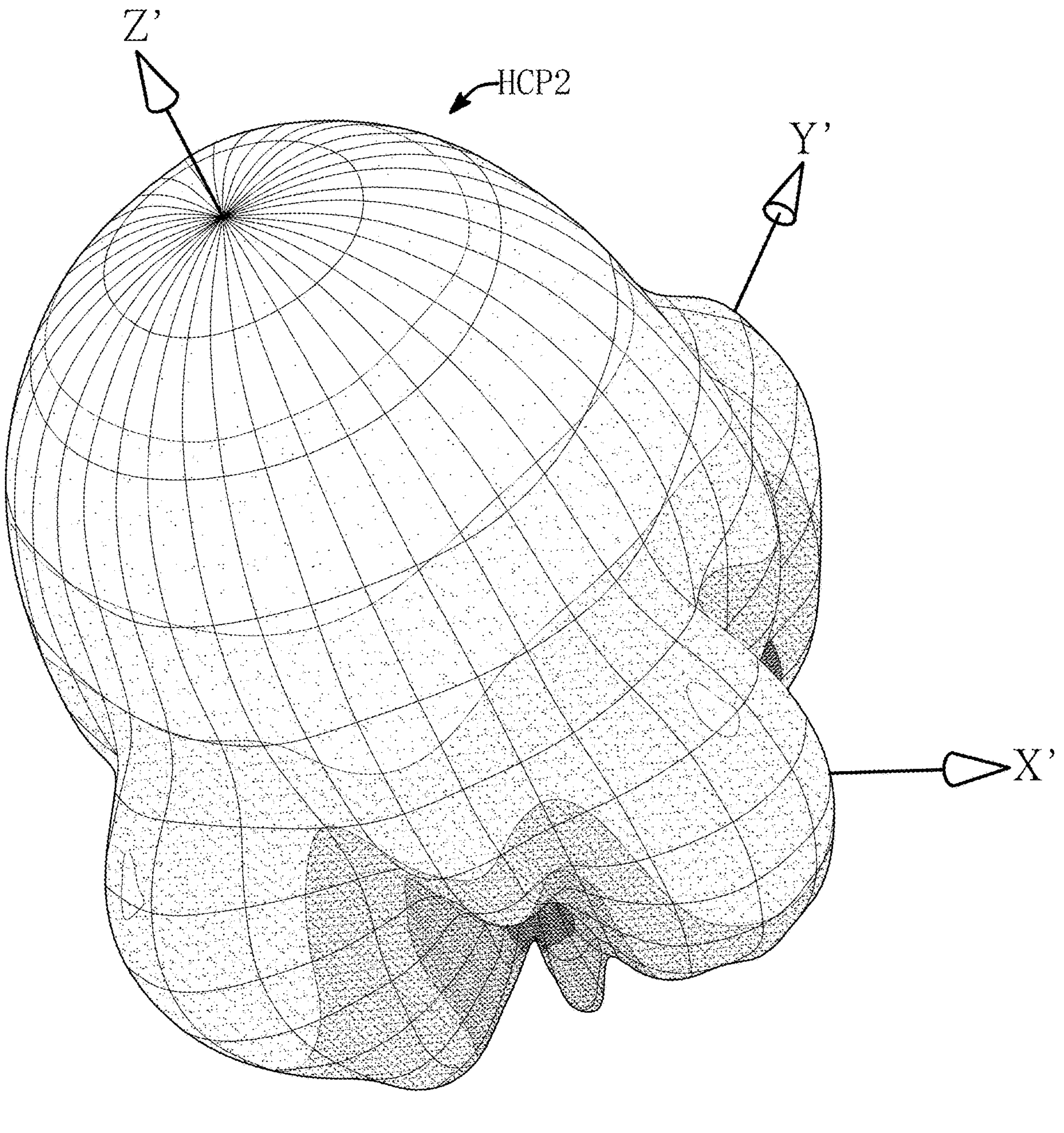
FIG. 7 is a schematic perspective view of a second circular polarization according to the present disclosure.

Referring to FIG. 1 to FIG. 11, the present disclosure provides a dual circularly polarized antenna structure 100. The dual circularly polarized antenna structure 100 is applicable for a transmission frequency band, and generates a first circular polarization HCP1 and a second circular polarization HCP2. A direction of rotation of the first circular polarization HCP1 is opposite to a direction of rotation of the second circular polarization HCP2 (as shown in FIG. 6 and FIG. 7). In other words, any antenna structure that cannot produce two circular polarizations having opposite directions of rotation at the same time is not the dual circularly polarized antenna structure 100 of the present disclosure.

Figure 2:
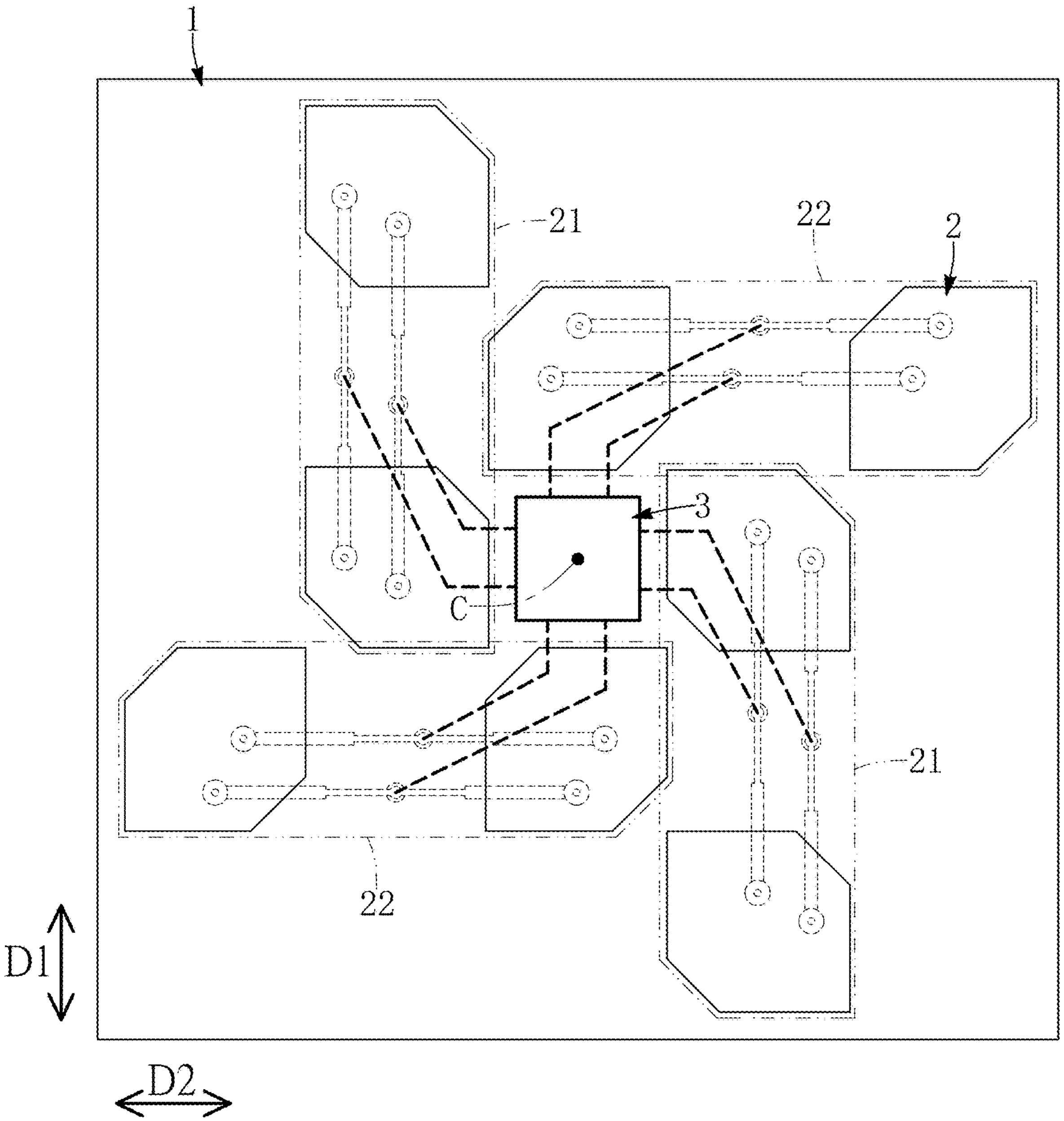
FIG. 2 is a schematic planar view of an antenna array according to the present disclosure.

Referring to FIG. 1 and FIG. 2, the dual circularly polarized antenna structure 100 includes a substrate 1, and an M number of antenna arrays 2 (M is a positive integer greater than or equal to 1) and a feed module 3 that are disposed on the substrate 1. The following description describes the structure and connection relation of each component of the dual circularly polarized antenna structure 100.

Referring to FIG. 1 and FIG. 4, the substrate 1 in the present embodiment is made of insulating material, and the substrate 1 can be exemplified to be a rectangular plate-shaped structure. In addition, the substrate 1 also has a first extension direction D1 and a second extension direction D2 that is perpendicular to the first extension direction D1. In the present embodiment, the first extension direction D1 is exemplified by a length extension direction of the substrate

1, and the second extension direction D2 is exemplified by a width extension direction of the substrate 1, but the present disclosure is not limited thereto.

Figure 3:
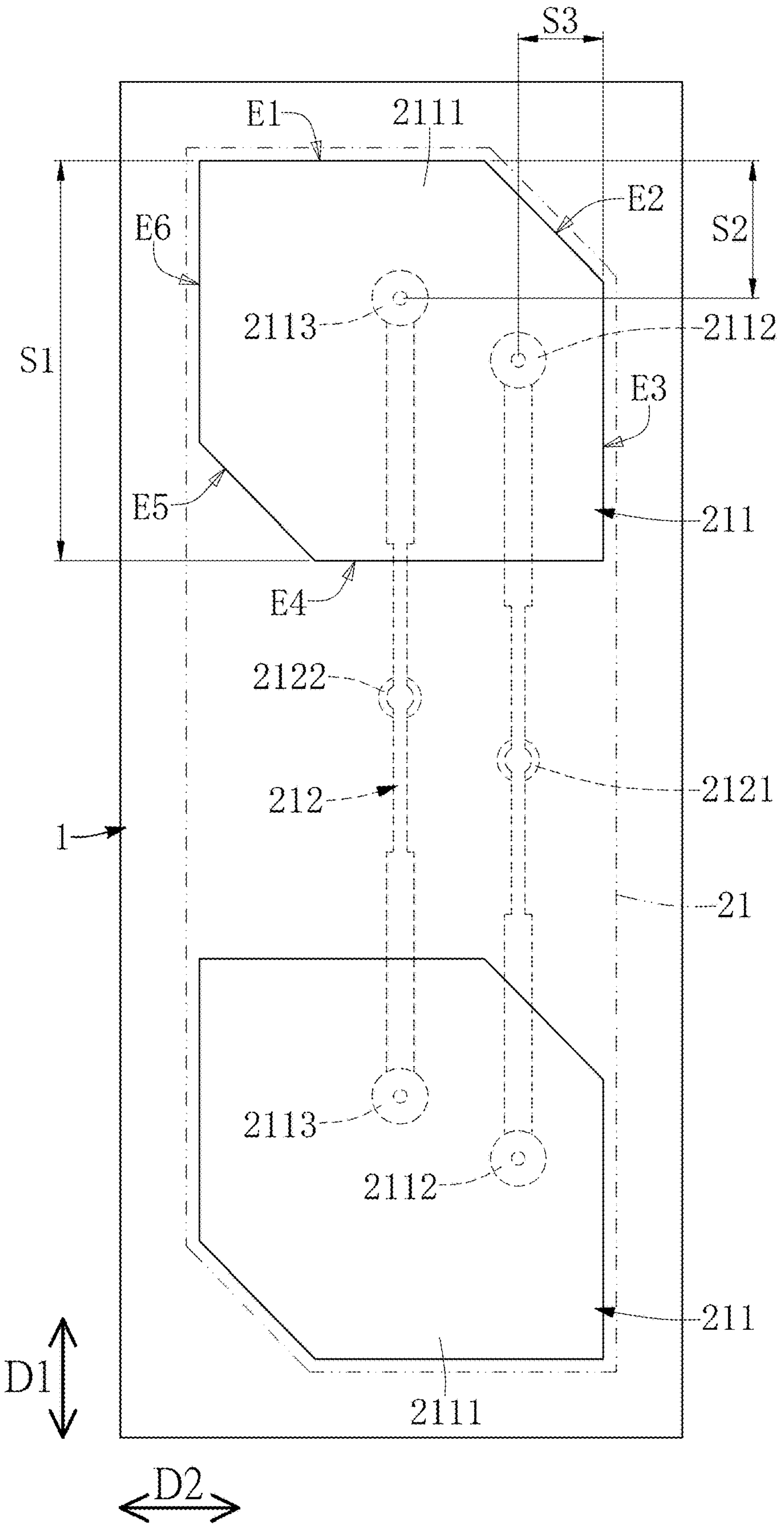
FIG. 3 is a schematic planar view of a first antenna according to the present disclosure.

Referring to FIG. 1 to FIG. 3, each of the M antenna arrays 2 includes two first antennas 21 and two second antennas 22 that are spaced apart from each other. FIG. 1 illustrates an example in which there are four antenna arrays 2 (i.e., M is 4), but the present disclosure is not limited thereto. Each of the two first antennas 21 includes two first sub-antennas 211 and two first microstrip lines 212, and each of the two second antennas 22 includes two second sub-antennas 221 and two second microstrip lines 222.

In detail, one of the two first sub-antennas 211 can overlap another one of the two first sub-antennas 211 when moving along the first extension direction D1, and each of the first sub-antenna 211 includes a first body 2111, and a first receiving contact point 2112 and a first transmission contact point 2113 that are disposed on the first body 2111. In the present embodiment, the first body 2111 is a conductive copper foil having a hexagonal structure, and has six side edges. A first shortest distance S1 is defined between any two opposite ones of the six side edges that are parallel to each other. The first shortest distance S1 is preferably 0.45 to 0.55 times a wavelength corresponding to a center frequency of the transmission frequency band.

Taking the first sub-antenna 211 located on top of the page in FIG. 3 as an example, the first body 2111 sequentially has a first side edge E1, a second side edge E2, a third side edge E3, a fourth side edge E4, a fifth side edge E5, and a sixth side edge E6 in a clockwise direction. The first side edge E1 is positioned opposite and parallel to the fourth side edge E4, the second side edge E2 is positioned opposite and parallel to the fifth side edge E5, and the third side edge E3 is positioned opposite and parallel to the sixth side edge E6. When the wavelength corresponding to the center frequency of the transmission frequency band is 12 millimeters (mm), a shortest distance between the first side edge E1 and the fourth side edge E4, a shortest distance between the second side edge E2 and the fifth side edge E5, and a shortest distance between the third side edge E3 and the sixth side edge E6 can be within a range from 5.4 millimeters (mm) to 6.6 millimeters (mm), but the present disclosure is not limited thereto.

Referring to FIG. 3 and FIG. 4, each of the first receiving contact point 2112 and the first transmission contact point 2113 in the present embodiment may be a via hole. In addition, the first receiving contact point 2112 and the first transmission contact point 2113 are each disposed on the first body 2111, and are spaced apart from each other. The first receiving contact point 2112 and the first transmission contact point 2113 are electrically coupled to the feed module 3, the first transmission contact point 2113 is used for transmission purposes (i.e., TX), and the first receiving contact point 2112 is used for reception purposes (i.e., RX).

More specifically, a connection line (not shown) between the first receiving contact point 2112 and the first transmission contact point 2113 of each of the two first antennas 21 is not parallel to the first extension direction D1. A position defined by orthogonally projecting the first transmission feed point 2122 onto the first body 2111 is adjacent to one of the six side edges (e.g., the first side edge E1 in FIG. 3), and a second shortest distance S2 is defined there-between. A position defined by orthogonally projecting the first receiving feed point 2121 onto the first body 2111 is adjacent to one of the six side edges (e.g., the third side edge E3 in FIG. 3), and a third shortest distance S3 is defined there-between. The second shortest distance S2 is greater than the third shortest distance S3.

Referring to FIG. 2 to FIG. 4, the two first microstrip lines 212 in the present embodiment are arranged along the first extension direction D1. That is to say, the two first microstrip lines 212 are linear in shape, but the present disclosure is not limited thereto. For example, in certain embodiments of the present disclosure (not shown), the two first microstrip lines 212 may also be non-linear in shape (e.g., C-shaped or S-shaped). That is, the two first microstrip lines 212 are not arranged along the first extension direction D1.

In addition, one of the two first microstrip lines 212 is electrically coupled to the first receiving contact points 2112 of the two first sub-antennas 211 and has a first receiving feed point 2121. Another one of the two first microstrip lines 212 is electrically coupled to the first transmission contact points 2113 of the two first sub-antennas 211 and has a first transmission feed point 2122. In practice, the two first microstrip lines 212 may be connected to the first receiving feed point 2121 and the first transmission feed point 2122 through coupling conduction. Moreover, the first receiving feed point 2121 and the first transmission feed point 2122 are connected to a ground component of the substrate 1 (e.g., a lower component of the substrate 1 in FIG. 4).

Referring to FIG. 1 and FIG. 5, one of the two second sub-antennas 221 can overlap another one of the two second sub-antennas 221 when moving along the second extension direction D2.

Each of the two second sub-antennas 221 includes a second body 2211, and a second receiving contact point 2212 and a second transmission contact point 2213 that are disposed on the second body 2211. The component configurations of the two second sub-antennas 221 are substantially the same as those of the two first sub-antennas 211. In other words, the second body 2211 in the present embodiment is a hexagonal structure, and has six side edges. A first shortest distance S1 is defined between any two opposite ones of the six side edges that are parallel to each other. The first shortest distance S1 is preferably 0.45 to 0.55 times a wavelength corresponding to a center frequency of the transmission frequency band.

Moreover, a connection line (not shown) between the second receiving contact point 2212 and the second transmission contact point 2213 of each of the two second antennas 22 is not parallel to the second extension direction D2. In the present embodiment, each of the second receiving contact point 2212 and the second transmission contact point 2213 may be a via hole. The second receiving contact point 2212 and the second transmission contact point 2213 are each disposed on the second body 2211, and are spaced apart from each other. The second receiving contact point 2212 and the second transmission contact point 2213 are electrically coupled to the feed module 3, the second transmission contact point 2213 is used for transmission purposes (i.e., TX), and the second receiving contact 2212 is used for reception purposes (i.e., RX).

Naturally, a position defined by orthogonally projecting the second transmission feed point 2222 onto the second body 2211 is adjacent to one of the six side edges, and a second shortest distance S2 is defined there-between. A position defined by orthogonally projecting the second receiving feed point 2221 onto the second body 2211 is adjacent to one of the six side edges, and a third shortest distance S3 is defined there-between. The second shortest distance S2 is greater than the third shortest distance S3.

Moreover, the two second microstrip lines 222 in the present embodiment are arranged along the second extension direction D2. That is to say, the two second microstrip lines 222 are linear in shape, but the present disclosure is not limited thereto. One of the two second microstrip lines 222 is electrically coupled to the second receiving contact points 2212 of the two second sub-antennas 221 and has a second receiving feed point 2221. Another one of the two second microstrip lines 222 is electrically coupled to the second transmission contact points 2213 of the two second sub-antennas 221 and has a second transmission feed point 2222.

It is worth mentioning that a center point C is defined between the two first antennas 21 and the two second antennas 22. One of the first sub-antennas 211 of each of the two first antennas 21, and one of the second sub-antennas 221 of each of the two second antennas 22 (i.e., two first sub-antennas 211 and two second sub-antennas 221) are adjacent to the center point C, and have a 4-fold rotational symmetry relative to the center point C (as shown in FIG. 2).

In practice, the two first antennas 21 and the two second antennas 22 may also have a 4-fold rotational symmetry relative to the center point C. In other words, in the first antenna 21 and the second antenna 22 that are adjacent to each other, the two first sub-antennas 211 also have a 4-fold rotational symmetry with the two second sub-antennas 221 through the center point C.

In other words, the two first antennas 21 and the two second antennas 22 have substantially the same structure and configuration. Furthermore, in any two adjacent ones of the first antennas 21 and the second antennas 22, the components of the first antenna 21 can overlap with the components of the second antenna 22 by rotating 90 degrees relative to the center point C in a clockwise or a counterclockwise direction.

Referring to FIG. 2, the feed module 3 is electrically coupled to the M antenna arrays 2 for generating the first circular polarization HCP1 and the second circular polarization HCP2 that are opposite to each other in the direction of rotation. FIG. 6 is a schematic perspective view of the first circular polarization HCP1, and FIG. 7 is a schematic perspective view of the second circular polarization HCP2. The density of points in the diagram is directly proportional to the gain value.

In the present embodiment, a 180-degree phase difference is provided between the first receiving feed points 2121 of the two first antennas 21, a 180-degree phase difference is provided between the second receiving feed points 2221 of the two second antennas 22, and a 90-degree phase difference is provided between each of the first receiving feed points 2121 and any one of the second receiving feed points 2221. Moreover, a 180-degree phase difference is provided between the first transmission feed points 2122 of the two first antennas 21, a 180-degree phase difference is provided between the second transmission feed points 2222 of the two second antennas 22, and a 90-degree phase difference is provided between each of the first transmission feed points 2122 and any one of the second transmission feed points 2222.

An angle increment direction of the two first receiving feed points 2121 and the two second receiving feed points 2221 is opposite to an angle increment direction of the two first transmission feed points 2122 and the two second transmission feed points 2222. Accordingly, the two first receiving feed points 2121 and the two second receiving feed points 2221 can jointly generate the first circular polarization HCP1 through the feed module 3, and the two first transmission feed points 2122 and the two second transmission feed points 2222 can jointly generate the second circular polarization HCP2 through the feed module 3.

Reference is made to FIG. 2, which is to be read in conjunction with FIG. 3 and FIG. 5. For example, when the second receiving feed point 2221 of one of the two second antennas 22 (which is located on top of the page and parallel to the second extension direction D2) receives a signal (1W, 0 degrees), the second receiving feed point 2221 of another one of the two second antennas 22 and the first receiving feed points 2121 of the two first antennas 21 are sequentially fed with signals (1W, 90 degrees), (1W, 180 degrees), and (1W, −90 degrees) in a clockwise direction. In other words, phase inputs for the two first receiving feed points 2121 and the two second receiving feed points 2221 sequentially increase in a clockwise direction. Accordingly, the two first receiving feed points 2121 and the two second receiving feed points 2221 can jointly generate the right-handed first circular polarization HCP1 through the feed module 3 (as shown in FIG. 6).

Reference is made to FIG. 2, which is to be read in conjunction with FIG. 3 and FIG. 5. Conversely, when the second transmission feed point 2222 of one of the two second antennas 22 (which is located on top of the page and parallel to the second extension direction D2) receives a signal (1W, 0 degrees), the second transmission feed point 2222 of another one of the two second antennas 22 and the first transmission feed points 2122 of the two first antennas 21 are sequentially fed with signals (1W, 90 degrees), (1W, 180 degrees), and (1W, −90 degrees) in a counterclockwise direction. In other words, phase inputs for the two first transmission feed points 2122 and the two second transmission feed points 2222 sequentially increase in a counterclockwise direction. Accordingly, the two first transmission feed points 2122 and the two second transmission feed points 2222 can jointly generate the left-handed second circular polarization HCP2 through the feed module 3 (as shown in FIG. 7).

Figure 8:
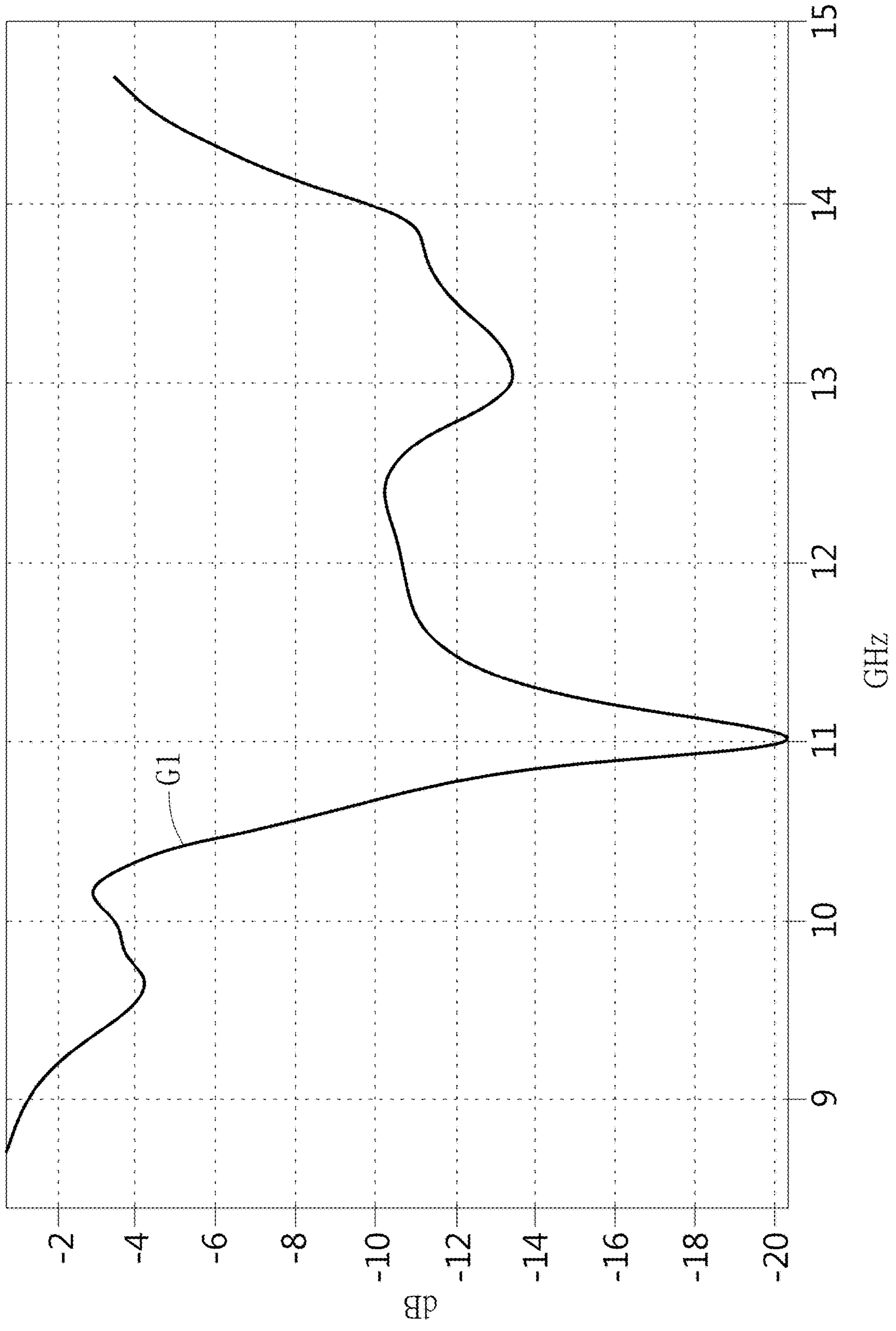
FIG. 8 is a diagram showing a return loss of a first receiving feed point and a second receiving feed point according to the present disclosure.
Figure 9:
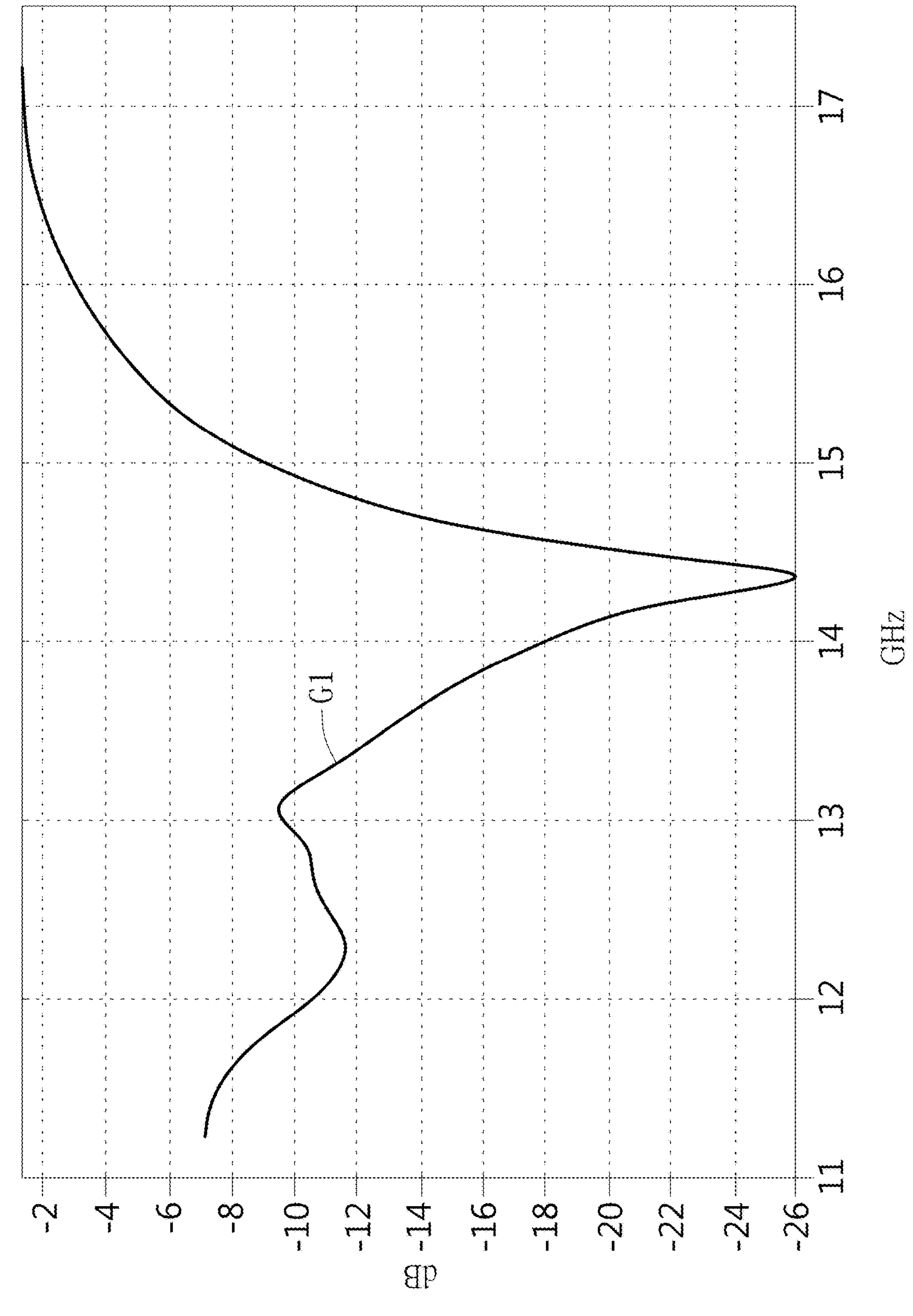
FIG. 9 is a diagram showing a return loss of a first transmission feed point and a second transmission feed point according to the present disclosure.

It should be noted that FIG. 8 shows return loss results that are actually measured for the first transmission feed point 2122 or the second transmission feed point 2222, and FIG. 9 shows return loss results that are actually measured for the first receiving feed point 2121 or the second receiving feed point 2221. In FIG. 8 and FIG. 9, the horizontal axis represents frequency, and the vertical axis represents power. A measured data line G1 is provided in each of FIG. 8 and FIG. 9. In the measured data line G1, Sij corresponds to (1,1), and represents the energy input from an ith input port and the energy measured at a jth output port.

Referring to FIG. 8 and FIG. 9, the first transmission feed point 2122 or the second transmission feed point 2222 that is within a range from 14 GHz to 14.5 GHz has a power of less than −10 dB, and the first receiving feed point 2121 or the second receiving feed point 2221 that is within a range from 10.7 GHz to 12.7 GHz has a power of less than −10 dB. That is to say, a frequency range of the first transmission feed point 2122 or the second transmission feed point 2222 is preferably from 14 GHz to 14.5 GHZ, and a frequency range of the first receiving feed point 2121 or the second receiving feed point 2221 is preferably from 10.7 GHz to 12.7 GHZ.

In addition, it is worth mentioning that the feed module 3 in one of the embodiments may be M number of beamforming chips connected to the M antenna arrays 2 (as shown in FIG. 2). Specifically, the feed module 3 includes the M beamforming chips. The M beamforming chips are respectively disposed on the center points C of the M antenna arrays 2, and are electrically coupled to the two first receiving feed points 2121, the two second receiving feed points 2221, the two first transmission feed points 2122, and the two second transmission feed points 2222 of each of the M antenna arrays 2.

Figure 10:
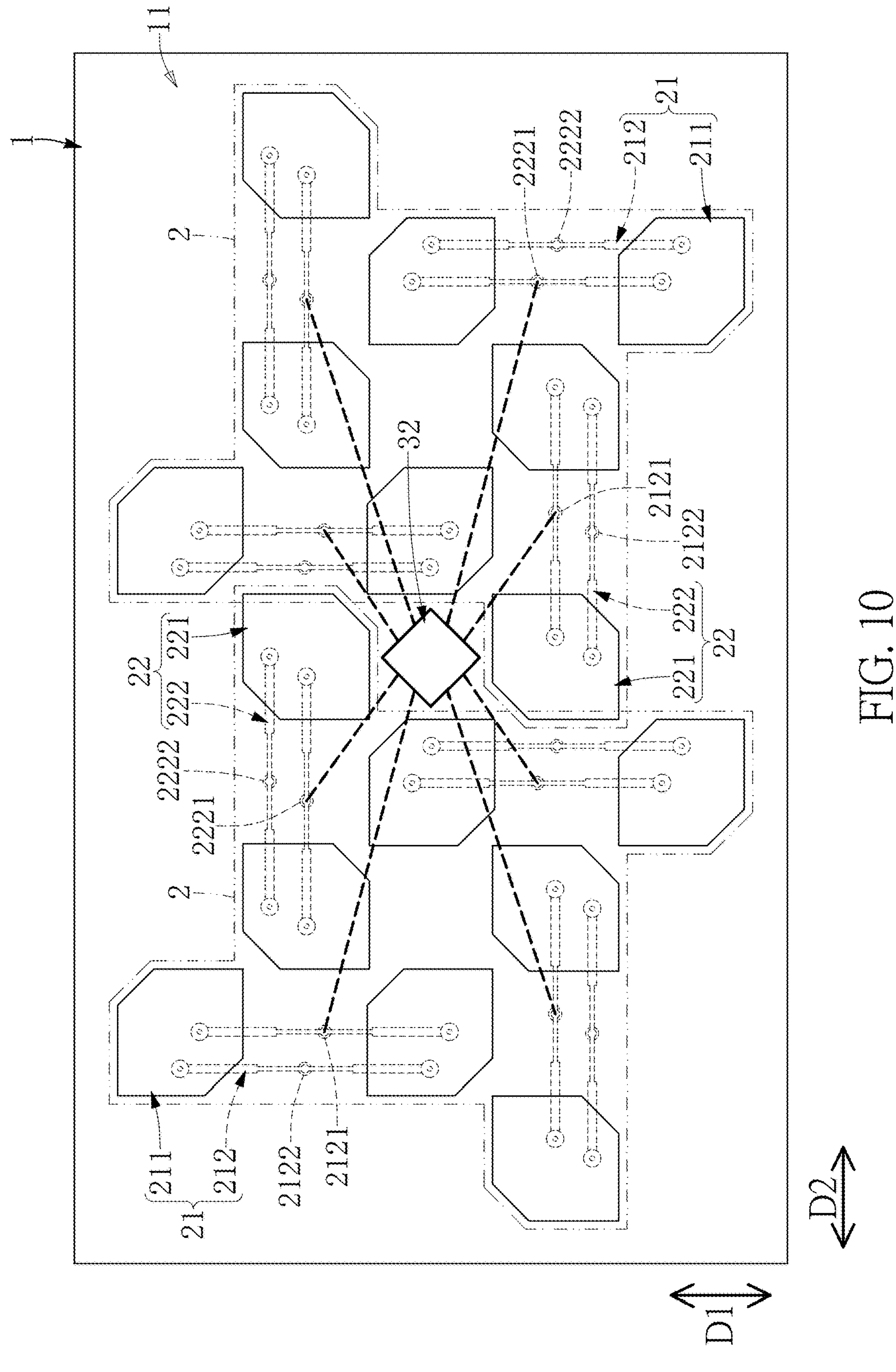
FIG. 10 is a schematic planar view of another configuration of the dual circularly polarized antenna structure according to the present disclosure.
Figure 11:
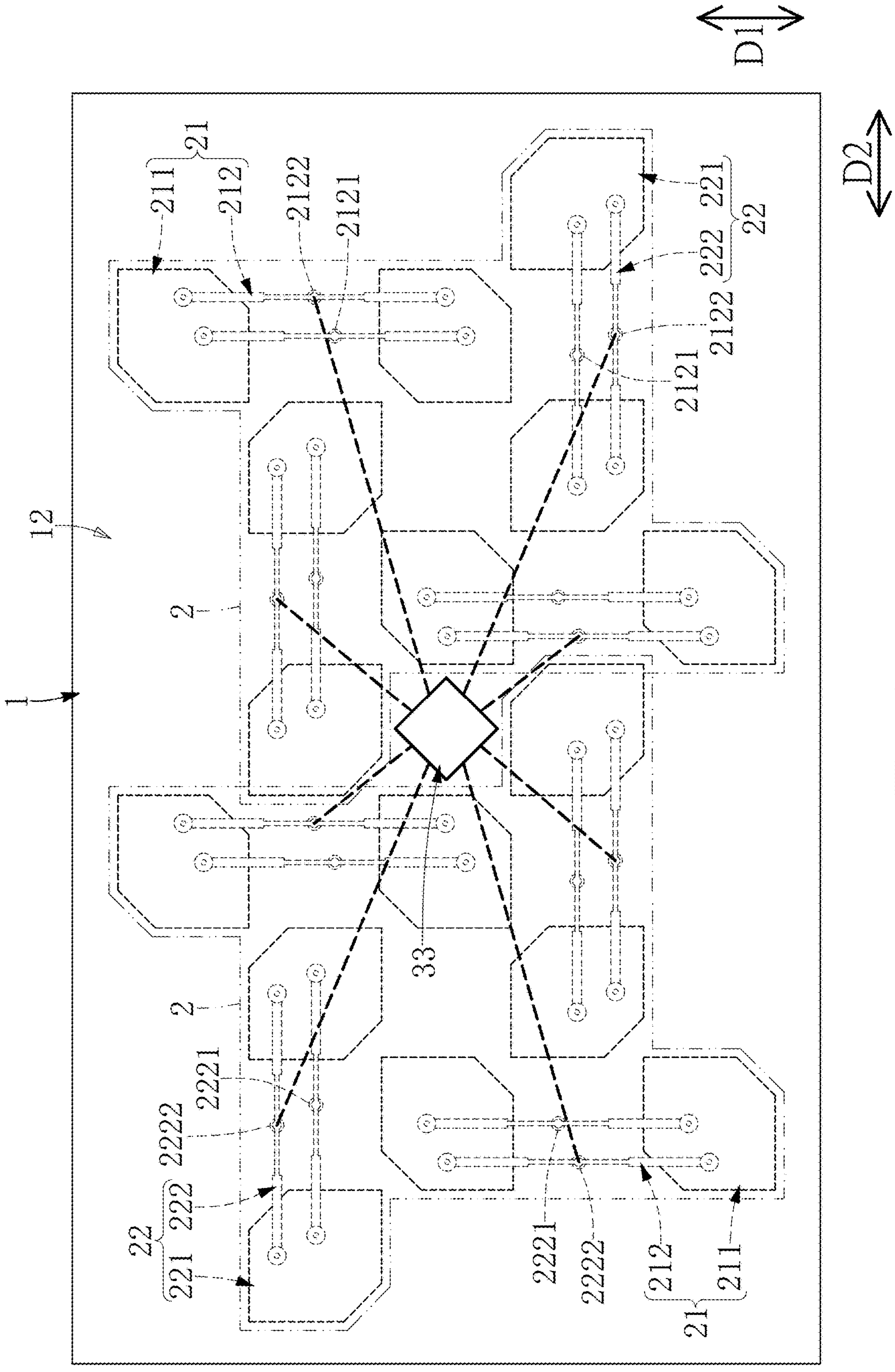
FIG. 11 is a schematic planar view of yet another configuration of the dual circularly polarized antenna structure according to the present disclosure.

In another one of the embodiments, as shown in FIG. 10 and FIG. 11, the feed module 3 can include N number of receiving chips 32 and N number of transmitting chips 33 that are respectively connected to the M antenna arrays 2. Here, Mis twice N, and N is a positive integer greater than or equal to 1.

Specifically, the N receiving chips 32 may be disposed on one side surface 11 of the substrate 1, and each of the N receiving chips 32 is arranged between any two adjacent ones of the M antenna arrays 2, so as to be electrically coupled to each of the first receiving feed points 2121 and each of the second receiving feed points 2221 of the two antenna arrays 2.

In other words, in each of the two embodiments, every two antenna arrays 2 include two beamforming chips, or one receiving chip 32 and one transmitting chip 33. Therefore, the number of chips used in the dual circularly polarized antenna structure 100 can be effectively reduced, but the present disclosure is not limited thereto.

For, example, in certain embodiments of the present disclosure (not shown), the dual circularly polarized antenna structure 100 may include two substrates 1. One of the two substrates 1 is provided with the N receiving chips 32 and the M antenna arrays 2, and each of the N receiving chips 32 is connected to the first receiving feed points 2121 and the second receiving points 2221 of two adjacent ones of the M antenna arrays 2. Another one of the two substrates 1 is provided with the N transmitting chips 33 and the M antenna arrays 2, and each of the N transmitting chips 33 is connected to the first transmitting feed points 2122 and the second transmitting points 2222 of two adjacent ones of the M antenna arrays 2.

Beneficial Effects of the Embodiment

In conclusion, in the dual circularly polarized antenna structure provided by the present disclosure, by virtue of "one of the two first sub-antennas being configured to overlap another one of the two first sub-antennas when moving along the first extension direction, and one of the two second sub-antennas being configured to overlap another one of the two second sub-antennas when moving along the second extension direction," and "one of the first sub-antennas of each of the two first antennas and one of the second sub-antennas of each of the two second antennas being adjacent to the center point, and having a 4-fold rotational symmetry relative to the center point," the dual circularly polarized antenna structure can have low manufacturing costs and a reduced signal loss.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A dual circularly polarized antenna structure, comprising:

a substrate having a first extension direction and a second extension direction that is perpendicular to the first extension direction;

an M number of antenna arrays disposed on the substrate, wherein M is a positive integer greater than or equal to 1, and each of the M antenna arrays includes:

two first antennas, wherein each of the two first antennas includes:

two first sub-antennas arranged along the first extension direction, wherein each of the two first sub-antennas includes a first body, and a first receiving contact point and a first transmission contact point that are disposed on the first body; wherein one of the two first sub-antennas is configured to overlap another one of the two first sub-antennas when moving along the first extension direction; and two first microstrip lines, wherein one of the two first microstrip lines is electrically coupled to the first receiving contact points of the two first sub-antennas, and has a first receiving feed point; wherein another one of the two first microstrip lines is electrically coupled to the first transmission contact points of the two first sub-antennas, and has a first transmission feed point; and two second antennas, wherein each of the two second antennas includes:

two second sub-antennas arranged along the second extension direction, wherein each of the two second sub-antennas includes a second body, and a second receiving contact point and a second transmission contact point that are disposed on the second body; wherein one of the two second sub-antennas is configured to overlap another one of the two second sub-antennas when moving along the second extension direction; and two second microstrip lines, wherein one of the two second microstrip lines is electrically coupled to the second receiving contact points of the two second sub-antennas, and has a second receiving feed point; wherein another one of the two second microstrip lines is electrically coupled to the second transmission contact points of the two second sub-antennas, and has a second transmission feed point;

wherein a center point is defined between the two first antennas and the two second antennas; wherein one of the first sub-antennas of each of the two first antennas and one of the second sub-antennas of each of the two second antennas are adjacent to the center point, and have a 4-fold rotational symmetry relative to the center point; and a feed module, wherein the feed module is electrically coupled to each of the M antenna arrays for generating a first circular polarization and a second circular polarization; wherein a direction of rotation of the first circular polarization is opposite to a direction of rotation of the second circular polarization.

2. The dual circularly polarized antenna structure according to claim 1, wherein a 180-degree phase difference is provided between the first receiving feed points of the two first antennas, a 180-degree phase difference is provided between the second receiving feed points of the two second antennas, and a 90-degree phase difference is provided between each of the first receiving feed points and any one of the second receiving feed points; wherein a 180-degree phase difference is provided between the first transmission feed points of the two first antennas, a 180-degree phase difference is provided between the second transmission feed points of the two second antennas, and a 90-degree phase difference is provided between each of the first transmission feed points and any one of the second transmission feed points.

3. The dual circularly polarized antenna structure according to claim 2, wherein the two first receiving feed points of the two first microstrip lines and the two second receiving feed points of the two second microstrip lines are configured to jointly generate the first circular polarization through the feed module, and the two first transmission feed points of the two first microstrip lines and the two second transmission feed points of the two second microstrip lines are configured to jointly generate the second circular polarization through the feed module.

4. The dual circularly polarized antenna structure according to claim 1, wherein the feed module includes an N number of receiving chips and an N number of transmitting chips, M is twice N, and N is a positive integer greater than or equal to 1; wherein each of the N receiving chips is disposed between any two adjacent ones of the M antenna arrays, so as to be electrically coupled to each of the first receiving feed points and each of the second receiving feed points of the two antenna arrays; wherein each of the N transmitting chips is disposed between any two adjacent ones of the M antenna arrays, so as to be electrically coupled to each of the first transmission feed points and each of the second transmission feed points of the two antenna arrays.

5. The dual circularly polarized antenna structure according to claim 1, wherein the feed module includes an M number of beamforming chips that are respectively disposed on the center points of the M antenna arrays; wherein the M beamforming chips are respectively and electrically coupled to the two first receiving feed points, the two second receiving feed points, the two first transmission feed points, and the two second transmission feed points of the M antenna arrays.

6. The dual circularly polarized antenna structure according to claim 1, wherein the dual circularly polarized antenna structure is applicable for a transmission frequency band; wherein each of the first bodies of the two first antennas and the second bodies of the two second antennas has a hexagonal shape and six side edges; wherein a first shortest distance is defined between any two opposite ones of the six side edges that are parallel to each other, and the first shortest distance is 0.45 to 0.55 times a wavelength corresponding to a center frequency of the transmission frequency band.

7. The dual circularly polarized antenna structure according to claim 6, wherein a position defined by orthogonally projecting the first transmission feed point onto the first body is adjacent to one of the six side edges, and a second shortest distance is defined there-between; wherein a position defined by orthogonally projecting the first receiving feed point onto the first body is adjacent to one of the six side edges, and a third shortest distance is defined there-between; wherein the second shortest distance is greater than the third shortest distance.

8. The dual circularly polarized antenna structure according to claim 6, wherein a position defined by orthogonally projecting the second transmission feed point onto the second body is adjacent to one of the six side edges, and a second shortest distance is defined there-between; wherein a position defined by orthogonally projecting the second receiving feed point onto the second body is adjacent to one of the six side edges, and a third shortest distance is defined there-between; wherein the second shortest distance is greater than the third shortest distance.

* * * * *